United States Patent [19]
Hoefer et al.

[11] Patent Number: 4,792,582
[45] Date of Patent: Dec. 20, 1988

[54] POLYETHYLENE GLYCOL ETHER FOAM INHIBITORS, EMULSIFIERS, AND STABILIZERS FOR POLYMERS

[75] Inventors: Rainer Hoefer, Duesseldorf; Alfred Meffert, Monheim; Robert Piorr, Ratingen-Hoesel; Bernd Wegemund, Haan; Uwe Held, Hilden, all of Fed. Rep. of Germany

[73] Assignee: Henkel Kommanditgesellschaft auf Aktien, Duesseldorf, Fed. Rep. of Germany

[21] Appl. No.: 895,077

[22] Filed: Aug. 11, 1986

[30] Foreign Application Priority Data

Aug. 24, 1985 [DE] Fed. Rep. of Germany ....... 3530301

[51] Int. Cl.⁴ ................................................. C08K 5/06
[52] U.S. Cl. .................................... 524/378; 524/755; 524/757; 526/209
[58] Field of Search ....................... 524/378, 755, 757; 526/209

[56] References Cited

U.S. PATENT DOCUMENTS

| 3,463,737 | 8/1969 | Kasperl et al. | 252/153 |
| 3,491,029 | 1/1970 | Kasperl et al. | 252/156 |
| 3,696,057 | 10/1972 | Schussler et al. | 252/544 |
| 4,522,740 | 6/1985 | Schmid et al. | 252/174.21 |
| 4,548,729 | 10/1985 | Schmid et al. | 252/174.21 |

FOREIGN PATENT DOCUMENTS

| 0748479 | 12/1966 | Canada | 524/755 |
| 2004956 | 8/1971 | Fed. Rep. of Germany | 524/378 |
| 2705555 | 8/1978 | Fed. Rep. of Germany | 524/378 |
| 0049636 | 3/1982 | Japan | 524/378 |
| 0105432 | 6/1982 | Japan | 524/378 |
| 0121070 | 7/1982 | Japan | 524/378 |
| 0128740 | 8/1982 | Japan | 524/378 |
| 0109548 | 6/1984 | Japan | 524/378 |
| 1172135 | 11/1969 | United Kingdom | . |
| 1172134 | 11/1969 | United Kingdom | . |

Primary Examiner—Joseph L. Schofer
Assistant Examiner—J. M. Reddick
Attorney, Agent, or Firm—Ernest G. Szoke; Henry E. Millson, Jr.; Mark A. Greenfield

[57] ABSTRACT

A method for emulsifying, emulsion-stabilizing, and/or foam-inhibiting an aqueous polymer dispersion or latex by incorporating therein a polyglycol ether; and a polymer dispersion or latex composition containing such polyglycol ether.

22 Claims, No Drawings

POLYETHYLENE GLYCOL ETHER FOAM INHIBITORS, EMULSIFIERS, AND STABILIZERS FOR POLYMERS

BACKGROUND OF THE INVENTION

1. Field of the Invention

This invention relates to the use of certain terminal-group-blocked alkylpolyethylene glycolethers in aqueous polymer dispersions and latices for foam inhibitors, emulsification, and/or stabilization.

2. Statement of the Related Art

German patent publication No. 33 15 951 (Henkel case D6859), which corresponds to U.S. application Ser. No. 601,475, and is incorporated herein by reference, relates to the use of polyethylene glycolethers corresponding to the formula $$R_1-O-(CH_2CH_2O)_n-R_2 \qquad (I)$$

in which $R_1$ is a straight-chain or branched $C_{8-18}$ alkyl or alkenyl, $R_2$ is a $C_{4-8}$ alkyl, and n is a number from 7 to 12, as foam-inhibiting additives for low-foam cleaning preparations. The foam inhibitors in question are particularly intended for use in cleaning preparations for commerce and industry which includes the cleaning of metal, glass, ceramic and plastic surfaces. Compared with foam-inhibiting additives based on adducts of aklyene oxides of inorganic compounds containing reactive hydrogen atoms in the molecule as known from: U.S. Pat. No. 3,491,029 (and corresponding German patent publication No. 12 80 455), British patent publication No. 1,172,135 (and corresponding German patent publication No. 16 21 592); U.S. Pat. Nos. 3,463,737 and 3,491,029 (and corresponding German patent publication No. 12 89 597); British patent publication No. 1,172,134 (and corresponding German patent publication No. 16 21 593); and U.S. Pat. No. 3,696,057 (and corresponding German patent publication No. 19 44 569); the compounds corresponding to general formula I are distinguished by the fact that, in addition, they are biologically degradable, their biological degradability being determined by German governmentally stipulated methods as being equivalent to a BiAS removal of more than 80%.

In addition, German patent publication No. 33 15 951 describes in use of the polyethylene glycolethers corresponding to general formula I in admixture with polyethlene glycolethers of the type obtained by addition of from 4 to 20 parts by weight of ethylene oxide onto 1 part by weight of polyglycerol having a hydroxyl number of from 900 to 1200 and subsequent etherification of the free hydroxyl groups with $C_{4-8}$ alkyl halides. The preparation of polyglycerol/ethylene oxide ethers such as these and their use is the subject of U.S. Pat. No. 4,522,740 (and corresponding German patent publication No. 33 15 952).

As contrasted with detergent systems, the present invention provides improved aqueous polymer dispersions and latices and method for their preparation. Aqueous polymer dispersions and corresponding latices obtained by emulsion polymerization are used for a variety of commercial applications, for example as binder dispersions which are exposed to various stresses during transport and storage and in use. Polymer dispersions of the type in question are, basically, highly sensitive, unstable 2-phase systems which in practice are exposed to numerous destabilizing influences under utilization conditions. The stabilization of polymer dispersions and latices (i.e. in particular the prevention of undesirable creaming or coagulation), involves a complex set of problems for which many and various solutions have already been proposed. For example, polymer dispersions or emulsions of the type in question have to be protected against coagulation by freezing and thawing, and from the shear forces or other forces encountered during their formulation into emulsion paints, coating compositions, emulsion plasters, leather finishes, polishes, adhesives, textile auxiliaries, and the like. Nonionic surfactants, such as fatty alcohols, fatty acids, alkylphenol or fatty amine polyglycolethers, are mostly used for these stabilizing functions, although they generally promote foaming in the system and, in many cases, also show unsatisfactory biodegradability.

In the field of emulsion polymerization, there is a continuous search for new surfactants which show favorable properties both in the preparation of the emulsion and during the polymerization reaction, and particularly in regard to the properties of the polymer latex formed. This is made particularly difficult insofar as it is not possible to draw any reliable conclusions based upon the chemical structure of a surfactant as to its properties as a polymerization emulsifier or stabilizer.

DESCRIPTION OF THE INVENTION

Other than in the operating examples, or where otherwise indicated, all numbers expressing quantities of ingredients or reaction conditions used herein are to be understood as modified in all instances by the term "about".

In a first embodiment, therefore, the present invention relates to the use of at least one nonionic compound corresponding to the formula:

$$R_1-O-(CH_2CH_2O)_n-R_2 \qquad (I)$$

wherein $R_1$ is at least one straight-chain or branched $C_{8-18}$, preferably $C_{12-18}$ alkyl or alkenyl, $R_2$ is at least one $C_{4-8}$, preferably $C_{4-6}$, most preferably $C_4$ alkyl, and n is a number average of 7 to 30, preferably 7.5 to 20, most preferably 7.5 to 16, especially 8 to 10; in aqueous polymer dispersions and latices as an emulsifying and/or emulsion-stabilizing, biologically degradable constituent with foam-inhibiting properties. It is also possible to use products corresponding to formula I in which n has a value of 30 to 100 as polymerization stabilizers and emulsifiers, although in general they do not have a foam-inhibiting effect unless n is 30 or less, preferably 20 or less.

According to the invention, the compounds corresponding to general formula I may be present during the emulsion polymerization where they function as emulsifiers as co-emulsifiers, optionally in combination with other emulsifiers, for example anionic emulsifiers. The compounds also may be partly present during emulsion polymerization, with the balance being added after polymerization is completed. Alternatively, the compounds corresponding to general formula I may be added subsequently to completed polymer dispersions or latices to function as an additional stabilizer. These functions may also be combined with one another.

This invention encompasses using the compounds of formula I with almost all types of polymers in aqueous dispersion or latex form. Of particular interest are polymers, copolymers, terpolymers, etc., containing acrylic and/or (meth)acrylic monomers, including $C_{1-8}$ aklylacrylic and $C_{1-8}$ alkyl (meth)acrylic. Other useful monomers are vinyl acetate, styrene, butadiene, versatic acid vinyl ester, vinylidene chloride, and the like. Monomers such as vinyl chloride are also useful, particularly when the formula I compound functions as a co-emulsifier. A particularly useful polymer is a versatic acid vinyl ester/vinyl acetate/acrylic acid terpolymer. Other useful monomer combinations include acrylic acid/butadiene/styrene and styrene/butadiene.

This invention also encompasses using the compounds of formula I with copolymers in which a water-soluble comonomer may be present in up to 40%, preferably up to 10%, most preferably up to 2% by weight, based upon the total weight of the copolymer. Suitable water-soluble comonomers include, but are not limited to, polycarboxylic acids such as acrylic acid, methacrylic acid, and maleic acid anhydride; unsaturated nitriles such as acrylonitrile; and unsaturated sulfonic acids such as vinyl sulfonic acid.

So far as the preparation of the compounds of general formula I according to the invention is concerned, reference is made to German patent publication No. 33 15 951 which has already been discussed. Suitable starting materials for the preparation of these polyglycolethers are at least one natural fatty alcohol, for example n-octanol, n-decanol, n-dodecanol n-tetradecanol, n-hexadecanol, n-octadeconal, n-octadecen-9, 10-ol (oleylalcohol) and/or at least one synthetic linear alcohol containing an even or an odd number of carbon atoms of from 8 to 18, preferably from 12 to 18.

These fatty alcohols are reacted with ethylene oxide in a mol ratio of 1:7–30, after which the hydroxyl moieties present in the obtained intermediate reaction product are etherified. The reaction with ethylene oxide is carried out under known alkoxylation conditions, preferably in the presence of suitable alkaline catalysts. The etherfication of the free hydroxyl groups is preferably carried out under the known conditions of Williamson's ether synthesis using at least one straight-chain or branched $C_{4-8}$ alkyl halide, for example n-butyliodide, sec.-butylbromide, tert.-butylchloride, amylchloride, ter.-amylbromide, n-hexychloride, n-heptylbromide or n-octylchloride. N-Butyl compounds are preferred. In this connection, it can be of advantage to use alkylhalide and alkali in a stoichiometric excess, for example of from 100 to 200%, over the hydroxyl moieties to be etherified.

In another embodiment of the invention, the polyglycolethers corresponding to formula I are used in combination with at least one polyethylene glycolether of the type described in above mentioned U.S. Pat. No. 4,522,740, which is incorporated herein by reference. The polyethylene glycolethers are obtained by addition of from 4 to 20 parts by weight of ethylene oxide onto 1 part by weight of polyglycerol having a hydroxyl number of from 900 to 1,200 and subsequent etherification of the free hydroxyl groups with $C_{4-8}$ alkylhalides.

Polyglycerols of the above type accumulate as distillation residues in the commercial production of glycerol. They are mixtures of relatively high molecular weight condesates of glycerol, preferably of those containing from 2 to 10 glycerol moieties in the molecule. These polyglycerosl are characterized by their hydroxyl number, which is generally between 900 and 1,200. Corresponding polyglycerols may also be synthetically obtained, for example by prolonged heating of glycerol to 220° to 240° C. in the presence of caustic alkali, preferably in an inert gas atmosphere, and removal by distillation of the water formed during the condensation.

To produce the polyglycerol polyglycolethers optionally employed in accordance with this invention, the polyglycerols described above are best reacted with ethylene oxide in a weight ratio of 1:4–20 and the hydroxyl moieties present in the obtained reaction product are subsequently etherified. In this case also, the reaction with ethylene oxide is carried out under known alkoxylation conditions, preferably in the presence of suitable alkaline catalysts. Finally, the etherification of the free hydroxyl groups is again carried out under the known conditions of Williamson's ether synthesis using straight-chain or branched $C_{4-8}$ alkylhalides. However, the etherification of the free hydroxyl groups may also be carried out in accordance with German Pat. No. 868,147, by reaction with isoolefins, for example isobutylene, in the presence of an acidic catalyst.

In cases where mixtures of the polyglycolethers corresponding to formula I and the terminal-group-blocked polyglycerol polyglycolethers are used, weight ratios between these components of 1–9:1 are preferred, weight ratios of 2.5–9:1 being particularly preferred, because they are distinguished by a strong foam-inhibiting effect. These mixtures also satisfy environmental requirements in regard to their biodegradability. The polyglycolethers or polyglycolether mixtures used in accordance with the invention are also distinguished by alkali and acid stability.

The polymer dispersions or latices contain the compounds corresponding to general formula I or mixtures thereof with the polyglyceroleothers in quantities effective to emulsify them, to emulsion - stabilize them, and/or effective to inhibit foaming, preferably in quantities of 0.05 to 5% by weight, most preferably 0.5 to 3% by weight, based on the weight of total solids (dry matter) in the dispersion or latex.

EXAMPLES

EXAMPLE 1

A $C_{12-18}$ fatty alcohol+9.1 E.O.-n-butyl mixed ether (compound A) was tested as a foam-inhibiting additive in a 50% by weight terpolymer aqueous dispersion. The 50% polymer dispersion contained 33.0 parts by weight (pbw) vinylacetate (VAc), 14.4 pbw versatic acid vinylester (VeoVa 10) and 4.8 pbw acrylic acid (Ac), and was prepared with a mixture of a laurylether sufosuccinic acid semiester disodium salt and the condensation product of nonylphenol+30 E.O.

The described mixed ether was tested by comparison with a commercial E.O./P.O. block copolymer and the condensation product of nonylphenol + 10 E.O. by the following method. The described products were added in a quantity of 2%, based on the dry matter content of the polymer dispersion. For comparison, the polymer dispersion was tested without additives as standard (blank test). The results obtained are shown in Table I, below. The results clearly show that very good foam collapse properties compared with the blank test are obtained by addition of the described mixed ether. A distinct improvement in foam inhibition is obtained in relation to the prior art (E.O./P.O. block copolymer). A nonylphenol+10 E.O. of the type commonly used for stablizing polymer dispersions actually produced increased foaming compared with the standard test.

EXAMPLE 2

Example 2 (Table II) demonstrates the effect of using different quantities of compound A as compared to a standard (blank test).

Determination of the foam properties, such as foam generation and foam collapse, by the free-fall circulation method Testing is carried out on polymer dispersions.

Procedure 50 g of polymer dispersion were diluted with 450 g of fully deionized water and transferred to a 2-liter measuring cylinder surrounded by a heating jacket. The test was generally conducted at 25° C. Using a laboratory periostaltic pump (Heidolph type RG-L 85), the test dispersion was continuously circulated at a rate of 3 l·min$^{-1}$. The solution was drawn up from the bottom of the measuring cylinder through one glass tube and returned by free fall through another glass tube. The second glass tube was installed in the test arrangement in such a way that its outlet was situated level with the 2000 ml mark of the measuring cylinder. After 10 minutes, the maximum foam volume (total volume) was read off and the circulation stopped. Volumes of from about 1600 to 2100 ml were generally adjusted.

The total volume was read off at intervals of 0.5, 1, 2, 3, 5, 10 and 20 mins, and the values determined were recorded on a volume/time graph. The values thus obtained enable the foam properties of the polymer dispersion to be evaluated.

The described method may be used for testing the effect of foam-inhibiting substances or low-foam surfactants for their foam properties. In this case, the total volume of a polymer dispersion after circulation for 10 minutes and also the foam collapse after the predetermined times are determined. The measured values represent the standard for the further tests. For comparison, a test is carried out with the substance to be tested. The substance is added to the polymer dispersion before the 10-minute circulation.

Depending on the type of product, the quantities of test substance added amount to between 0.1 and 20%, based on the dry matter content of the dispersion.

The measured values are set out in Table I.

TABLE I**

| Addition (type/quantity, based on the dry matter content of the dispersion) | | Foam collapse in ml foam height after | | | | | |
|---|---|---|---|---|---|---|---|
| | | 0 mins. | 0.5 mins. | 3 mins. | 5 mins. | 10 mins. | 20 mins. |
| No addition | — | 2000 | 2000 | 1800 | 1700 | 900 | 560 |
| Product A | 2% | 2000 | 1950 | 1700 | 1350 | 520 | 400 |
| Nonylphenol 10 EO | 2% | 2000 | 2000 | 1850 | 1800 | 1100 | 600 |
| Commercial foam inhibitor (EO/PO adduct) | 2% | 2000 | 2000 | 1800 | 1500 | 600 | 400 |

**The test results are only comparable within one test series.

TABLE II**

| Addition (type/quantity, based on the dry matter content of the dispersion) | | Foam collapse in ml foam height after | | | | | |
|---|---|---|---|---|---|---|---|
| | | 0 mins. | 0.5 mins. | 3 mins. | 5 mins. | 10 mins. | 20 mins. |
| Product A | 0.2% | 2000 | 2000 | 1950 | 1750 | 1200 | 580 |
| Product A | 1.0% | 2000 | 2000 | 1700 | 1560 | 900 | 460 |
| Product A | 2.0% | 2000 | 1980 | 1700 | 1500 | 750 | 420 |
| Product A | 10.0% | 2000 | 1950 | 1670 | 1500 | 600 | 420 |
| Product A | 20.0% | 2000 | 1900 | 1600 | 1460 | 600 | 520 |
| No addition | — | 2000 | 2000 | 1950 | 1850 | 1680 | 1150 |

**The test results are only comparable within one test series.

EXAMPLE 3

Further compounds useful in the inventive process were prepared and tested, in which, referring to general formula I, $R^1$ was a $C_{12-18}$-alkyl, $R^2$ was $C_4$ (n-butyl), and n was varied. The following table summarizes these compounds.

| Invention Compound | Average n |
|---|---|
| B | 7.5 |
| C | 8.0 |
| D | 9.0 |
| A (See Ex. 1) | 9.1 |
| E | 10.0 |
| F | 16.0 |

All of the above compounds had an active substance content of approximately 100%. Compounds A and B–F were tested for foam supression ability in the same manner as A previously, with favorable results as stated below in Table III.

TABLE III

| Addition (type/quantity, based on the dry matter content of the dispersion) | | Foam collapse in ml foam height after | | | | | |
|---|---|---|---|---|---|---|---|
| | | 0 mins. | 0.5 mins. | 3 mins. | 5 mins. | 10 mins. | 20 mins. |
| No addition | — | 2000 | 2000 | 1800 | 1700 | 900 | 550 |
| Products B–F | 2% | 2000 | 1950–2000 | 1700–1750 | 1400–1500 | 600–650 | 450–500 |
| Product A | 2% | 2000 | 1950 | 1700 | 1350 | 530 | 400 |

EXAMPLE 4

Use of a $C_{12-18}$ fatty alcohol + 9.1 EO-n-butyl mixed ether (product A) as a polymerization emulsifier Test Formulation:
For testing, 3 solutions were prepared for each test:
Solution 1:
 1.3 g emulsifier X (100%) (anionic)
 0.5 g potassium peroxydisulfate
 0.2 g borax
 191.7 g fully deionized water
Solution 2:
 0.8 g emulsifier X (100%) (anionic)
 2.1 g borax
 1.9 g potassium peroxydisulfate
 12.0 g emulsifier Y (100%) (nonionic)
 288.4 g fully deionized water
Solution 3:
 330.1 g vinylacetate
 143.5 g versatic acid vinylester
 4.8 g acrylic acid
 23.9 g 10% ammonium carbonate solution

EXAMPLE 4.1

(Comparison Example)

A standard combination of anionic and nonionic emulsifiers was used. The anionic emulsifier X in solution 1 was a 33.4% aqueous solution of a sodium fatty acid methylester sulfonate while the nonionic emulsifier Y in solution 2 was a 70% nonylphenol + 30 E.O. in conjunction with another 0.8 g of active substance of anionic emulsifier X.

EXAMPLE 4.2

(Invention)

Product A according to the invention was used instead of nonylphenol + 30 EO as nonionic emulsifier Y in solution 2.

In all tests, the total quantity was adjusted to 1000 g by adding or leaving out water.

Polymerization process

The components of solution 1 were initially introduced into the reaction vessel, purged with nitrogen and heated to 80° C. During the heating period, a preemulsion was prepared in the reaction vessel by adding monomer solution 3 to the emulsifier-containing aqueous phase, solution 2, with vigorous stirring. The pH-value of the pre-emulsion was adjusted to 3.8–4.0. When the temperature inside the reactor reached 80° C., addition of the monomer pre-emulsion was commenced and lasted for 2 to 2.5 hours. On completion of the addition, the temperature of the reaction mixture was kept at 80° C. for another 2 hours. The dispersion was cooled and filtered and the pH-value adjusted to 7.0–7.5 with 23.9 g of a 10% ammonium carbonate solution.

Result:

Dispersions containing less than about 0.4% of coagulate (based on dry matter) were obtained. The dispersions according to 4.2 were low-foam dispersions. Thus, in the described measuring arrangement, the dispersion showed a foam height of 1700 ml after 0.5 mins., a foam height of 800 ml after 5 mins. and a foam height of only 480 ml after 10 mins.

By contrast, the dispersion according to Comparison Example 4.1 showed a foam height of 1900 ml after 0.5 min., a foam height of 1500 ml after 5 mins. and a foam height of 900 ml after 10 mins.

EXAMPLE 4.3

In solutions 1 and 2 of Example 4.1, the anionic emulsifier X was replaced by the nonionic product A according to the invention. The nonionic emulsifier Y (nonylphenol + 30 EO) was retained in solution 2.

A pure polymer dispersion stabilized by nonionic emulsifiers was formed. The coagulate content formed during polymerization was less than 0.4%, as in 4.1 and 4.2. The polymer dispersion formed was coarse and produced very little foam.

We claim:

1. A method of emulsifying, or emulsion-stabilizing, or foam-inhibiting, or a combination thereof an aqueous polymer dispersion or latex comprising incorporating therein an emulsifying effective, or emulsion-stabilizing effective or foam-inhibiting effective, or a combination thereof amount of at least one compound of the formula

$$R_1-O-(CH_2CH_2O)_n-R_2$$

Wherein:
 $R_1$ is a straight or branched chain $C_{8-18}$-alkyl or $C_{8-18}$-alkenyl;
 $R_2$ is a $C_{4-8}$-alkyl; and
 n is an average number between 7 and 100.

2. The method of claim 1 wherein said compound is partly present during emulsion polymerization of said polymer dispersion or latex, the balance being added after polymerization is completed.

3. The method claim 1 wherein said compound is completely present during emulsion polymerization of said polymer disperion or latex.

4. The method of claim 1 wherein said compound is added to a completed polymer dispersion or latex.

5. The method of claim 1 wherein said compound is present in about 0.5–5% by weight, based upon the weight of total 6. The method of claim 1 wherein said compound is present in about 0.5–3% by weight, based upon the weight of total solids.

7. The method of claim 1 wherein said compound is employed as a nonionic emulsifier or nonionic coemulsifier during emulsion polymerization of said polymer dispersion or latex.

8. The method of claim 1 wherein, in said formula, n is an average number of 30 or less, and said compound is used as a foam-inhibitor.

9. The method of claim 8 wherein n is 20 or less.

10. The method of claim 1 wherein said compound is used in admixture with at least one polyethylene glycol ether which is the reaction product of about 4–20 parts by weight of ethylene oxide and 1 part by weight of polyglycerol having a hydroxyl number of about 900–1,200, followed by subsequent etherification of free hydroxyl moietites with a $C_{4-8}$-alkyl halide.

11. The method of claim 10 wherein the weight ratio of said compound to said polyethylene glycol ether is about 1–9:1.

12. The method of claim 6 wherein said compound is used in admixture with at least one polyethylene glycol ether which is the reaction product of about 4–20 parts by weight of ethylene oxide and 1 part by weight of polyglycerol having a hydroxyl number of about 900–1,200, followed by subsequent etherification of free hydroxyl moieties with a $C_{4-8}$-alkyl halide.

13. The method of claim 12 wherein the weight ratio of said compound to said polyethylene glycol ether is about 1–9:1.

14. The method of claim 1 wherein:
$R_1$ is at least one $C_{12-18}$-alkenyl;
$R_2$ is at least one $C_{4-6}$-alkyl; and
n is an average number of 7.5 to 20.

15. The method of claim 12 wherein:
$R_1$ is at least one $C_{12-18}$-alkyl or alkenyl;
$R_2$ is at least one $C_{4-6}$-alkyl; and
n is an average number of 7.5 to 20.

16. The method of claim 1 wherein:
$R_1$ is at least one $C_{12-18}$-alkyl or alkenyl;
$R_2$ is a $C_4$-alkyl; and
n is an average number of 7.5 to 16.

17. The method of claim 13 wherein:
$R_1$ is at least one $C_{12-18}$-alkyl or alkenyl;
$R_2$ is a $C_4$-alkyl; and
n is an average number of 7.5 to 16.

18. The method of claim 17 wherein the weight ratio of said compound to said polyethylene glycol ether is about 2.5–9:1.

19. A stabilized, foam-inhibited, polymer dispersion or latex prepared by the method of claim 1 comprising
(a) at least one polymer, copolymer, or terpolymer;
(b) at least one compound of the formula $R_1-O-(CH_2CH_2O)_n-R_2$ wherein $R_1$ is a straight or branched chain $C_{8-18}$-alkyl or $C_{8-18}$-alkenyl, $R_2$ is a $C_{4-8}$-alkyl, and n is an average number between 7 and 100; and
(c) water.

20. The polymer dispersion or latex of claim 19, also comprising
(d) at least one polyethylene glycol ether other than ingredient b which is the reaction product of about 4–20 parts by weight of ethylene oxide and 1 part by weight of polyglycerol having a hydroxyl number of about 900–1,200, followed by subsequent etherification of free hydroxyl moieties with a $C_{4-8}$alkyl halide.

21. The polymer dispersion or latex of claim 19, also comprising
(e) at least one anionic surfactant other than ingredient b.

22. The polymer dispersion or latex of claim 20, also comprising
(f) at least one anionic surfactant other than ingredients b and e.

* * * * *